Feb. 6, 1973 A. L. MORRIS 3,715,015
BRAKE FOR ROLLABLE PLATFORM
Filed Dec. 22, 1971 2 Sheets-Sheet 1
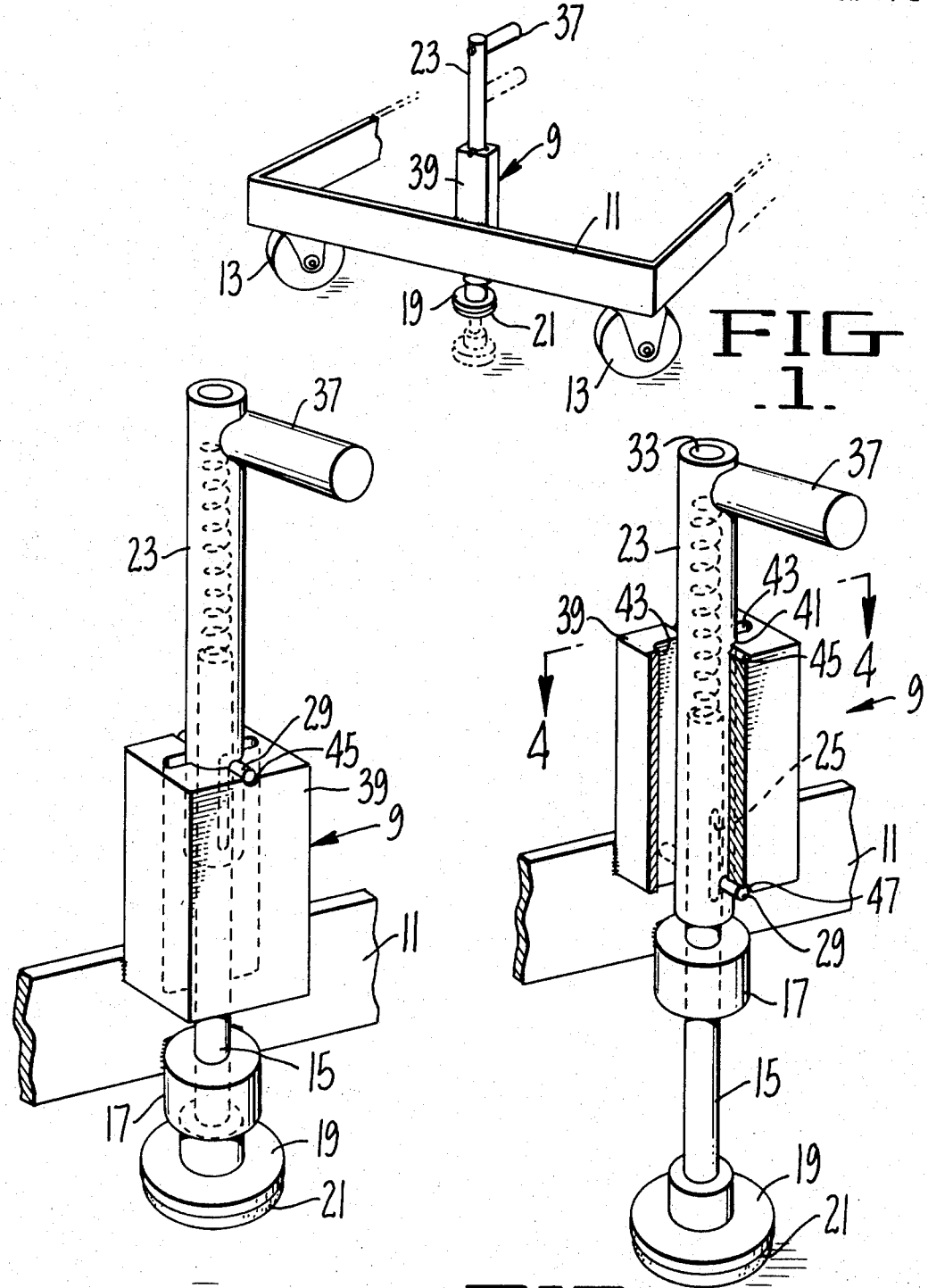
INVENTOR.
ARTHUR L. MORRIS
BY
ATTORNEY Feb. 6, 1973 A. L. MORRIS 3,715,015
BRAKE FOR ROLLABLE PLATFORM
Filed Dec. 22, 1971 2 Sheets-Sheet 2

INVENTOR.
ARTHUR L. MORRIS
BY
ATTORNEY

United States Patent Office 3,715,015
Patented Feb. 6, 1973

3,715,015
BRAKE FOR ROLLABLE PLATFORM
Arthur L. Morris, 1031 Crestview Drive,
Mountain View, Calif. 94040
Filed Dec. 22, 1971, Ser. No. 210,702
Int. Cl. B60t 1/14
U.S. Cl. 188—5
3 Claims

ABSTRACT OF THE DISCLOSURE

A brake for a rollable platform is provided which consists of a simple lever actuated pad adapted to hold the platform on level or irregular surfaces and independent of the wheels.

---

The invention described herein was made by a employee of the United States Government and may be manufactured and used by or for the Government for governmental purposes without the payment of any royalties thereon or therefor.

BACKGROUND OF THE INVENTION

Field of the invention

Frame mounted brake for rollable field platform.

Description of prior art

Prior art structures have dependend upon braking one or more wheels on a rollable platform, which is impractical for platforms mounted on casters, or have consisted of mechanical structures which were complicated and expensive.

SUMMARY OF THE INVENTION

Rigid steel platforms mounted on rollers or casters are used in many industries such as in the aircraft industry where rollable platforms are used by workers and technicians to fabricate aircraft, maintain them, repair them, to carry test equipment and the like. With such structures there is always the problem of providing a satisfactory brake for arresting the motion of the platform. It is ordinarily impractical to provide for a brake on the wheels of such platforms since such platforms are frequently mounted on rotatable casters, making a wheel brake impractical. Further, such platforms are frequently used on irregular surfaces so that provision must be made for holding the platform in place on such surfaces.

The device of the present invention will lock in place even on surfaces which extend above or below the wheel level.

The present invention is of simple and rugged mechanical construction so that no servicing is ordinarily required. Further, a simple twisting motion of the handle is sufficient to lock or unlock the structure. Other objects and advantages of the present invention will be brought out in a detailed description of the same.

BRIEF DESCRIPTION OF THE DRAWINGS

In the drawings forming part of this application:

FIG. 1 is a perspective view of a device embodying the present invention showing it mounted on a rollable platform.

FIG. 2 is an enlarged perspective view of a device embodying the present invention showing it in a raised position.

FIG. 3 is a view similar to FIG. 2 but showing the device of the present invention in the lowered or ground gripping position.

DESCRIPTION OF THE PREFERRED EMBODIMENT

Figure 4:
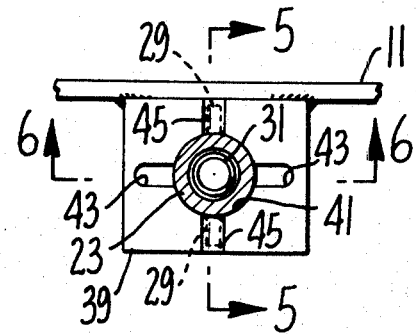
FIG. 4 is a section on the line 4—4 of FIG. 3.
Figure 5:
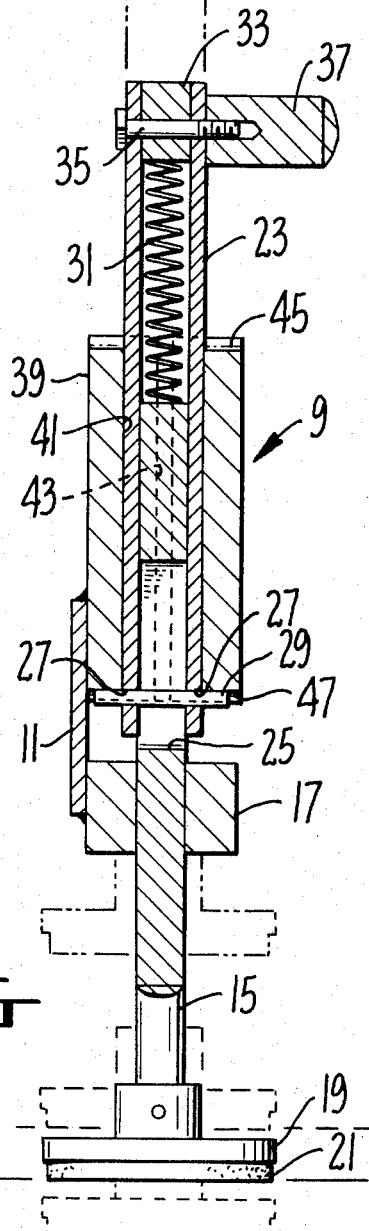
FIG. 5 is a section on the line 5—5 of FIG. 4.
Figure 6:
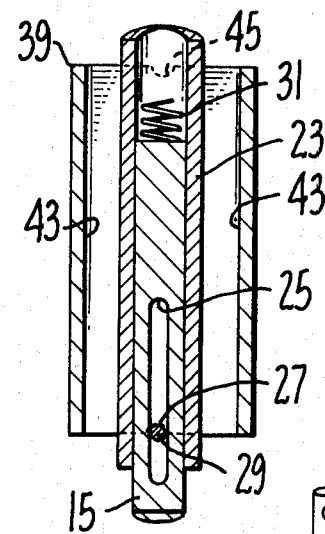
FIG. 6 is a partial sectional on the line 6—6 of FIG. 4.

Referring now to the drawings by reference characters, the brake of the present invention is generally designated 9 and is mounted on a frame member 11 of a movable platform having caster wheels 13. The brake includes a leg 15 mounted for sliding movement in a collar 17 which is welded or otherwise suitably fastened to the frame member 11. The bottom of the leg 15 terminates in an enlarged foot 19 which may be provided with a pad 21 of rubber or other suitable material.

Leg 15 telescopes in an easy sliding fit within a tube 23. Leg 15 has an elongated slot 25 near its top. Tube 23 is provided with mating holes 27 and a pin 29 is pressed through holes 27 and passes through slot 25 and extends outwardly from holes 27 so that leg 15 can slide easily within tube 23 for the length of slot 25.

Within tube 23 and mounted over leg 15 is a spring 31 which bears against the top of the leg 15 and the bottom of a plug 33. Plug 33 is mounted in the top of tube 23 and held in place by means of a screw 35 which also passes through and retains a handle 37. It is thus apparent that the action of spring 31 is such that normally pin 29 will be forced to the top of the slot 25. If pressure is placed on leg 15 it may be pushed upwardly against the force of the spring for the entire length of the slot.

Tube 23 is mounted for sliding movement in a guide 39 which is welded or otherwise suitably fastened onto the frame 11. Guide 39 has a central circular opening 41 through which tube 23 can easily slide. Guide 39 also has a slot 43 extending from both sides of the opening 41 and completely through the guide from top to bottom, slot 43 being of sufficient length to allow the pin 29 to pass freely therethrough. Guide 39 preferably also has a groove 45 at its top and 47 at its bottom, both of which are displaced somewhat from the slot 43 and which can both be conveniently at right angles thereto. Grooves 45 and 47 are adapted to retain pin 29 and to keep tube 23 from turning when the pin is in one or the other of the grooves.

Having now described the construction of the apparatus, the operation will be described. In FIG. 2 the brake is shown in its raised or inoperative position. It will be seen that the pin 29 is resting in the upper groove 45 and that foot 19 is held well above the surface on which the platform rests. Pin 29 is held by gravity in groove 45 so that there will be no tendency for the device to rattle or for tube 23 to turn. Now if one wishes to apply the brake, it is only necessary to raise the handle 37 slightly to disengage the pin 29 from groove 45 and then turn the handle, in either direction, so that the pin 29 is lined up with slot 43. One now pushes downwardly on the handle until the pin 29 has cleared the botom of guide 39 (which in the meantime has caused foot 19 to come into contact with the ground and to somewhat compress spring 31), and then turn handle 37 in either direction so pin 29 now is retained in the lower groove 47. Spring 31 now holds the foot 21 firmly in contact with the ground, preventing the frame 11 from moving. If one wishes to release the brake it is merely necessary to reverse the described procedure, i.e. depress slightly to disengage pin 29 from groove 47 and turn the handle 37 until pin 29 again lines up with slot 43, raise the handle until the pin clears the top of guide 39 and again twist the handle so that the pin 29 rests in the upper groove 45.

In constructing the device, normally the proportions would be such that when the pad 31 is level with the bottoms of the wheels 13, the pin is about half way in slot 25. This insures that the foot 19 will make good contact with the ground regardless of whether the level at the foot is higher or lower than that of the wheels. This is particularly important when the device is used on irregular surfaces.

Figure 7:
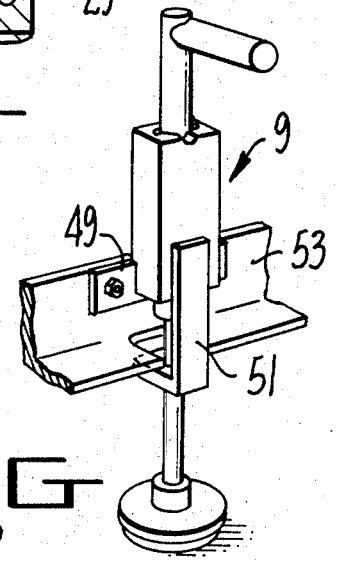
FIG. 7 is a perspective view of another embodiment of the invention.

In FIG. 7 another embodiment of the invention is shown wherein a brake generally designated 9 is provided with a first bracket 49 and a second bracket 51. This structure is particularly adapted for use with the frame made of angle iron as at 53.

It is believed apparent from the foregoing that I have provided an effective brake for a rollable platform which is simple in structure and positive in operation.

I claim:
1. A brake for a rollable platform or the like comprising in combination:
   (a) a guide member adapted to be fastened to a rollable platform, said guide member having a vertical circular passage therethrough and with vertical slots extending from each side of said passage,
   (b) a hollow tubular member mounted in and adapted to slide within said vertical circular passage,
   (c) a leg member mounted in and adapted to slide within said tubular member,
   (d) a spring pushing said leg outwardly in said tubular member,
   (e) a vertical slot in said leg and mating holes in opposite sides of said tubular member and a pin pressed through said holes and passing through said slot and extending on each side of the tubular member whereby said leg can slide within said tubular member by the distance of said slot against the action of said spring, and
   (f) means whereby said pin can rest on the top of said guide member to hold said brake out of operative position and whereby said tubular member can be pushed downwardly in said guide member with said pin passing through said vertical slot in the guide member and turned to place said pin against the bottom of said guide member to press said leg downwardly into an operative position.

2. The structure of claim 1 wherein the bottom and top of the guide member are provided with grooves extending at about 90° from said slot whereby said pin will be retained in one of said grooves in either the up or the down position.

3. The structure of claim 1 wherein the leg has a resident pad and the bottom thereof.

References Cited
UNITED STATES PATENTS

| | | | |
|---|---|---|---|
| 2,333,450 | 11/1943 | Staley | 188—5 X |
| 2,847,057 | 8/1958 | Holcombe | 188—5 X |
| 2,938,571 | 5/1960 | Simmerman | 188—5 X |
| 3,093,362 | 6/1963 | Schaefer | 188—5 X |

DUANE A. REGER, Primary Examiner

U.S. Cl. X.R.

248—354 P